(12) United States Patent
Mar et al.

(10) Patent No.: US 7,676,004 B2
(45) Date of Patent: Mar. 9, 2010

(54) COMBINATIONAL FUZZY-DECISION VITERBI DECODING SCHEME AND DEVICE FOR VEHICULAR COMMUNICATIONS SYSTEM VIA TIME-VARYING CHANNELS

(75) Inventors: Jeich Mar, Taoyuan (TW); Chi-Cheng Kuo, Taoyuan (TW)

(73) Assignee: Yuan Ze University, Taoyuan (TW)

( * ) Notice: Subject to any disclaimer, the term of this patent is extended or adjusted under 35 U.S.C. 154(b) by 785 days.

(21) Appl. No.: 11/534,201

(22) Filed: Sep. 21, 2006

(65) Prior Publication Data
US 2008/0025426 A1 Jan. 31, 2008

(30) Foreign Application Priority Data
Jul. 28, 2006 (TW) .............................. 95127636 A

(51) Int. Cl.
*H03D 1/00* (2006.01)
(52) U.S. Cl. ....................................... 375/341; 714/796
(58) Field of Classification Search ................. 375/265, 375/341; 714/795, 796
See application file for complete search history.

(56) References Cited

OTHER PUBLICATIONS

S. Coleri, M. Ergen and A. Bahai, Channel Estimation Techniques Based on Pilot Arrangement in OFDM Systems, IEEE Transactions on Broadcasting, Sep. 2002, pp. 223-229, vol. 48, No. 3.
Stephen B. Wicker, The Viterbi Decoding Algorithm, Error Control Systems for Digital Communication and Storage, 1995, pp. 290-303, Prentice-Hall, Inc., New Jersey.
Y. Zhao and A. Huang, A Novel Channel Estimation Method for OFDM Mobile Communication Systems Based on Pilot Signals and Transform-Domain Processing, IEEE 47th Vehicular Technology Conference, May 1997, pp. 2089-2093.
J. Rinnie and M. Renfors, pilot Spacing in Orthogonal Frequency Division Multiplexing Systems on Practical Channels, IEEE Tran. On Consumer Electronics, Nov. 1996, pp. 959-962, vol. 42, No. 4.
J. Heiskala and J. Terry, OFDM Wireless LANs: A Theoretical and Practical Guide, 2001, Sams.
J. Giarratano and G. Riley, Inexact Reasoning, Expert Systems, 2nd Edition, 1994, pp. 288-291, PWS Publishing Company.
IEEE Std 802.11a-1999, Part 11: Wireless LAN Medium Access Control (MAC) and Physical Layer (PHY) Specifications: High-Speed Physical Layer in the 5 GHZ Band, Sep. 1999.

*Primary Examiner*—Kevin Y Kim
(74) *Attorney, Agent, or Firm*—WPAT., P.C.; Justin King

(57) ABSTRACT

The invention presents a combinational fuzzy-decision Viterbi decoder, which combines the modified Π and S-membership functions, to further improve the performance of the dedicated short-range communications (DSRC) system operated in the time-varying fading channel. The combinational fuzzy-decision Viterbi decoder includes parallel-to-serial converter, fuzzy-decision constellation decoder and analog Viterbi decoder. The coding gain of the DSRC system using the proposed combinational fuzzy-decision Viterbi decoder is compared with both the hard-decision and soft-decision Viterbi decoder for the BPSK, QPSK, 16-QAM and 64-QAM OFDM DSRC systems. The improvement in performance of the DSRC system achieved by replacing the hard decision and soft decision Viterbi decoder with the proposed combinational fuzzy-decision Viterbi decoder will be validated with simulations.

5 Claims, 8 Drawing Sheets

Block diagram of Combinational fuzzy decision Viterbi decoder

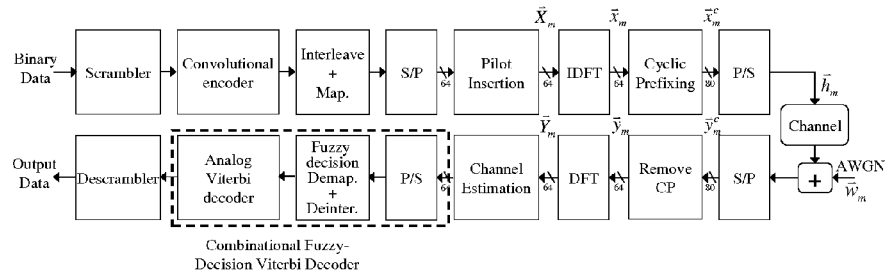
Figure 1 The block diagram of the baseband model for the DSRC system
Figure 2 Puncturing patterns for 3/4 coding rate
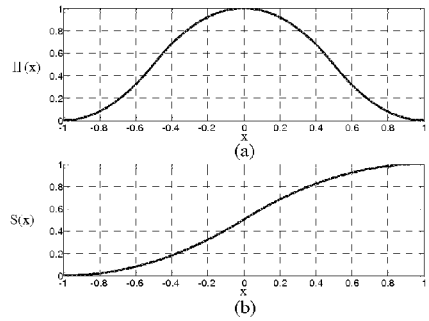
Figure 3 (a) Π-membership function; (b) S- membership function
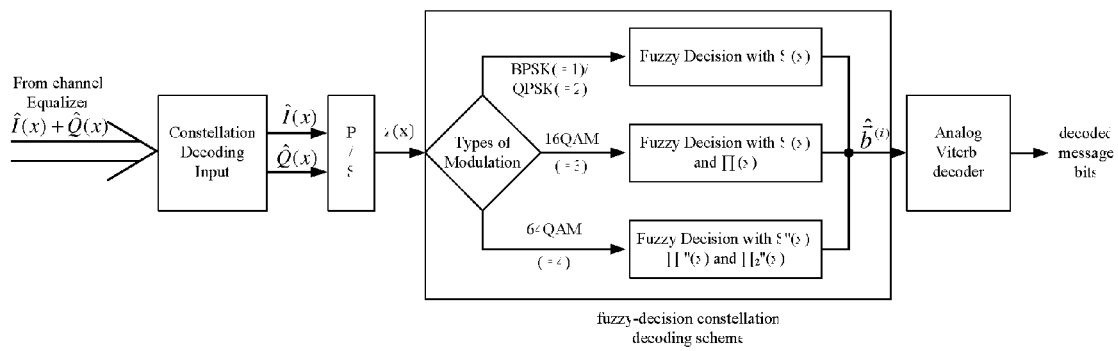
Figure 4 Block diagram of Combinational fuzzy decision Viterbi decoder

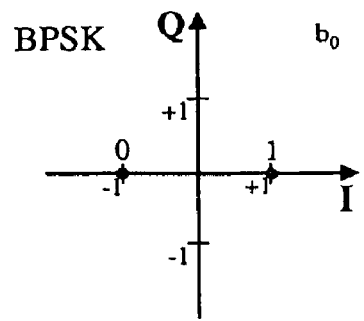
(a)
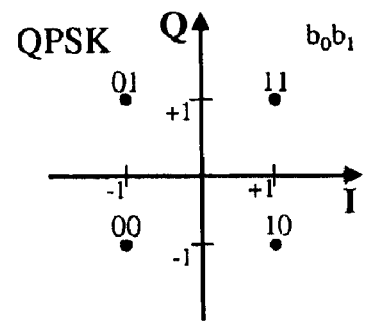
(b)
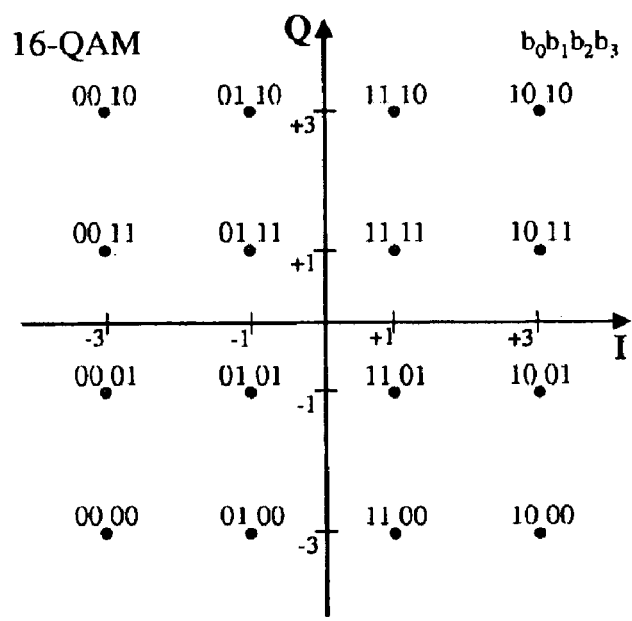
(c)
Figure 5

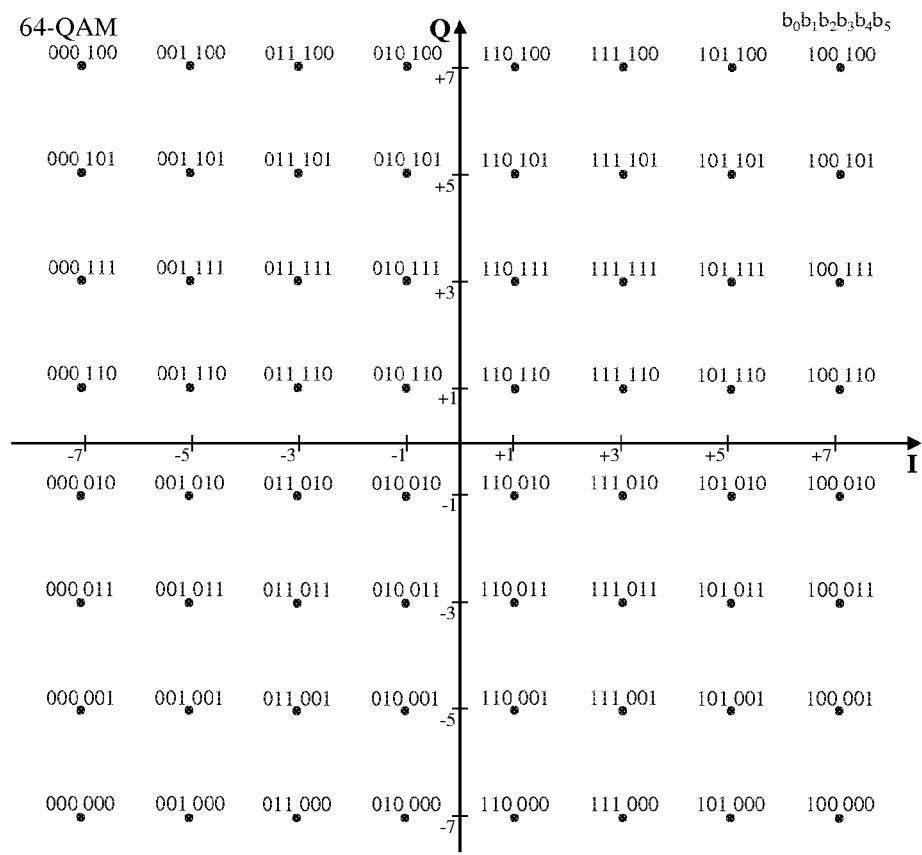
Figure 5 Constellation bit encoding diagram for (a)BPSK (b) QPSK (c) 16-QAM (d)64-QAM
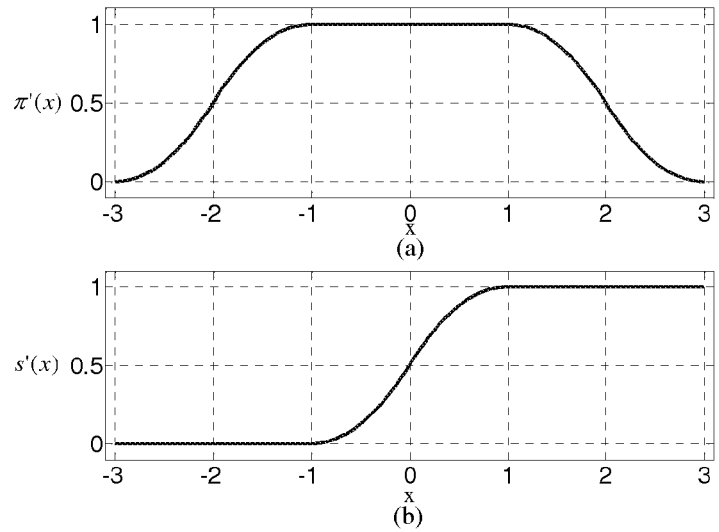
Figure 6 (a) Modified $\Pi'$- membership function (b) Modified $S'$-membership function

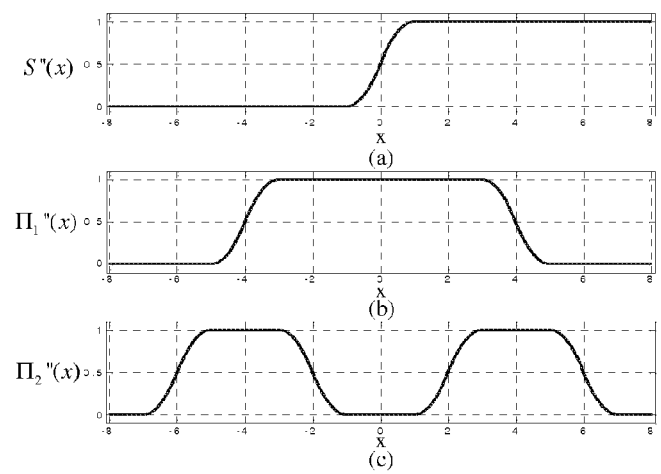
Figure 7 (a) Modified $S''$-membership function (b) Modified $\Pi_1''$- membership function (c) Modified $\Pi_2''$- membership function

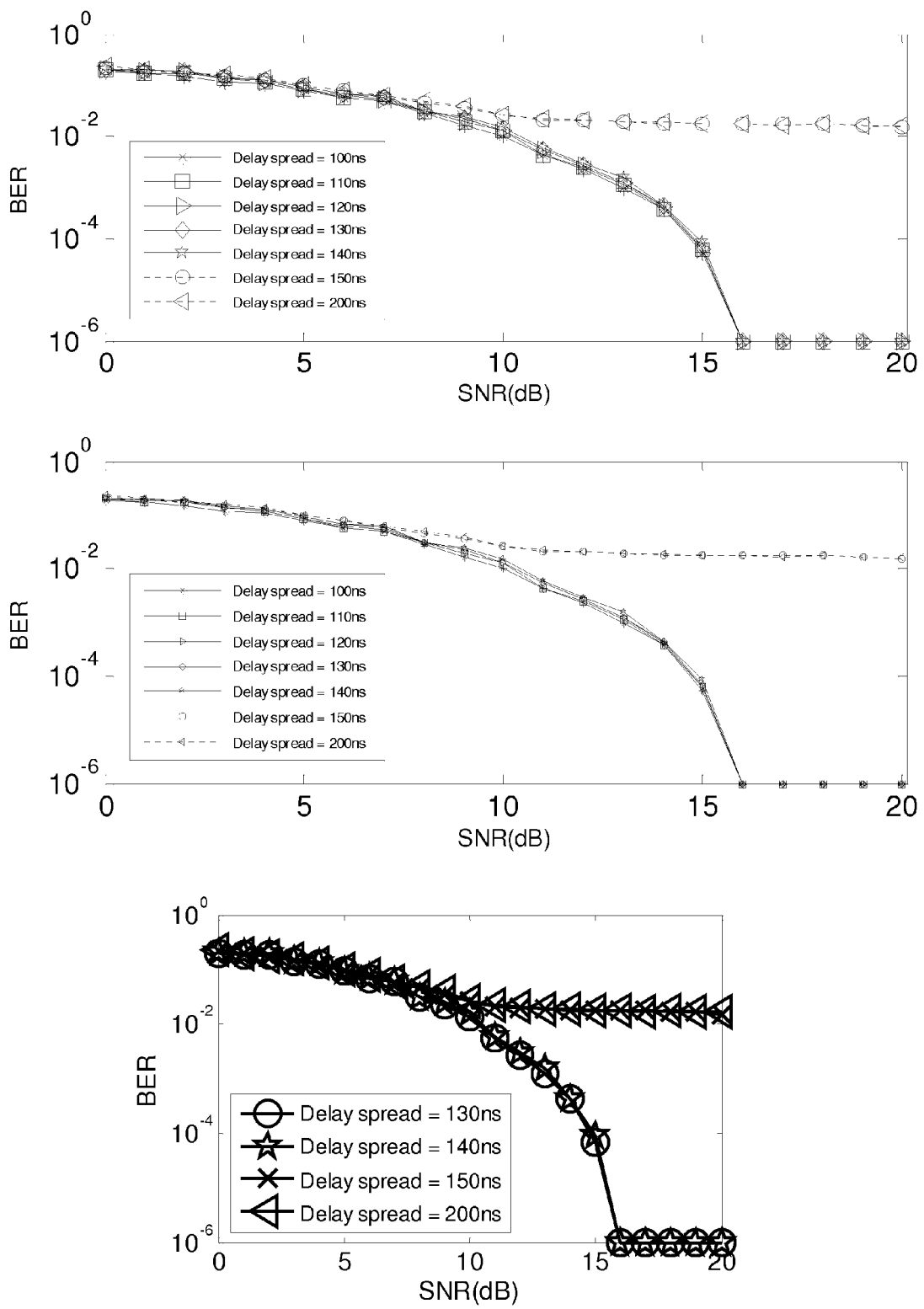
Figure 8 BERs of the DSRC system using pilot sub-carrier-aided equalizer in different delay spread for 16 QAM-OFDM modulations

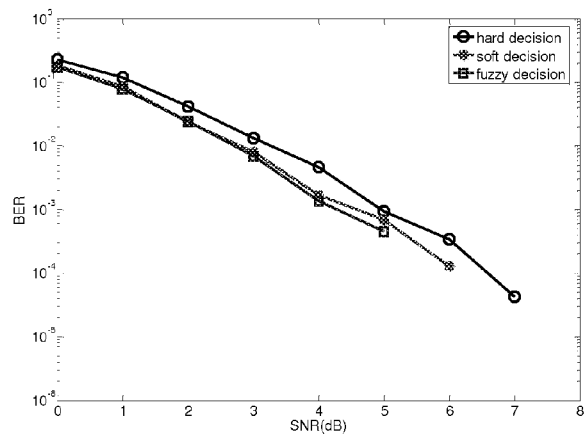
Figure 9 Comparisons of BERs of the BPSK-OFDM DSRC system (3 Mbits/sec; 200km/h) for different
Viterbi decoders
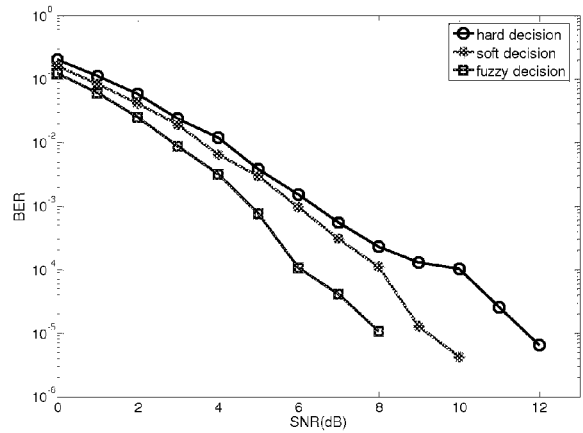
Figure 10 Comparisons of BERs of the QPSK-OFDM DSRC system (6 Mbits/sec; 200km/h) for different
Viterbi decoders

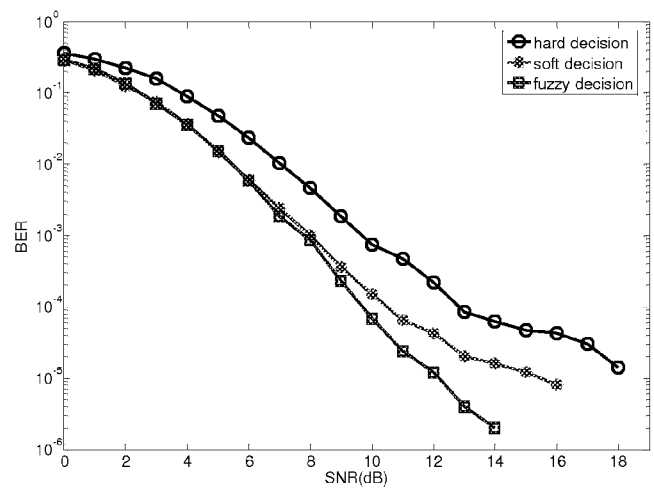
Figure 11 Comparisons of BERs of the 16 QAM-OFDM DSRC system (12 Mbits/sec; 200km/h) for different Viterbi decoders
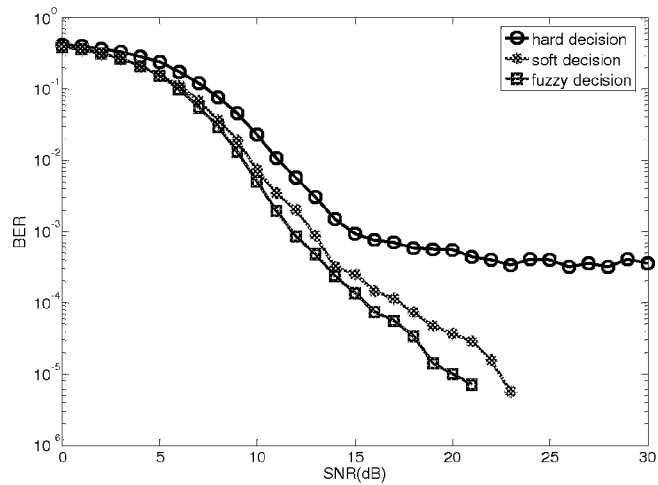
Figure 12 Comparisons of BERs of the 16 QAM-OFDM DSRC system (18 Mbits/sec; 200km/h) for different Viterbi decoders

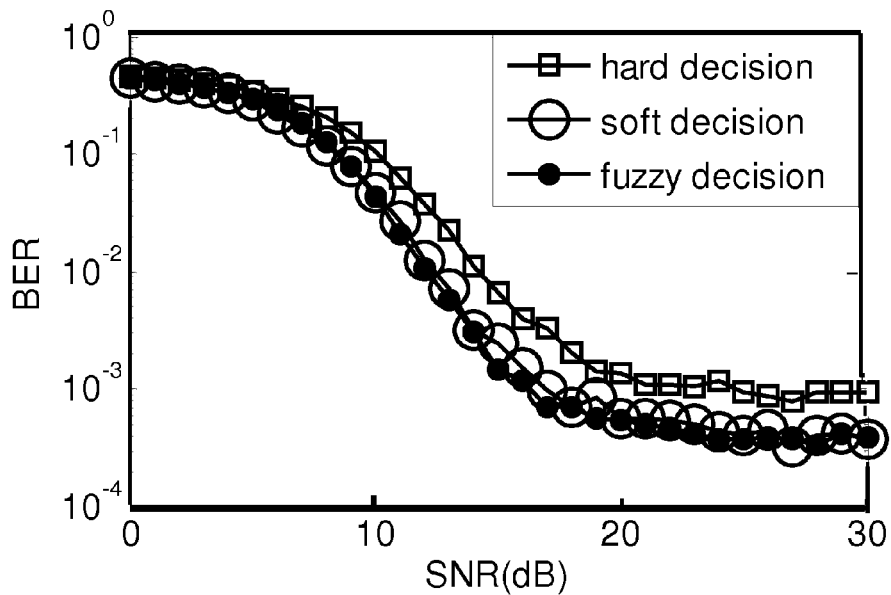
Figure 13 Comparisons of BERs of the 64 QAM-OFDM DSRC system (24 Mbits/sec; 200km/h) for different Viterbi decoders
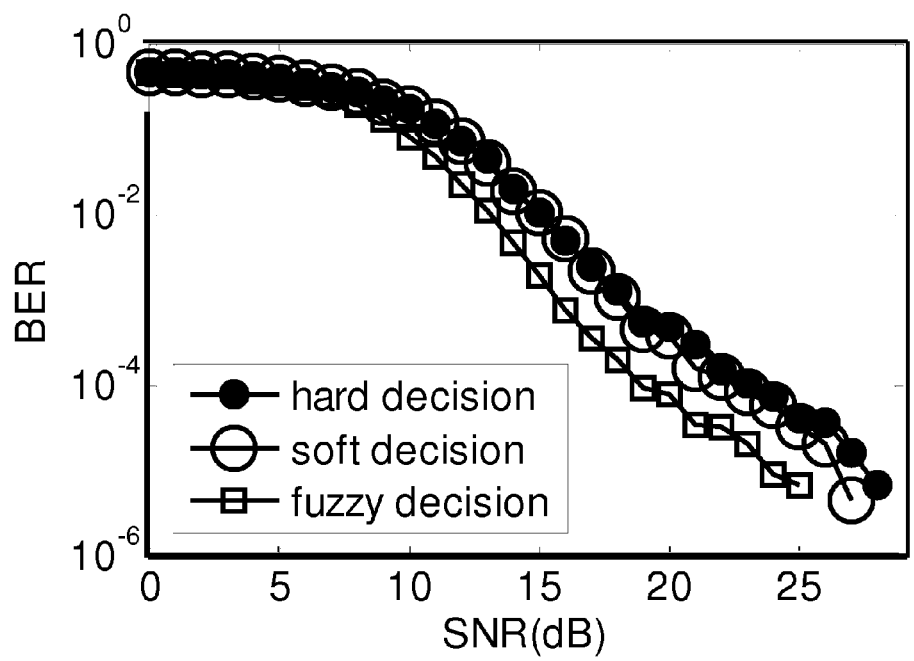
Figure 14 Comparisons of BERs of the 64 QAM-OFDM DSRC system (27 Mbits/sec; 120km/h) for different Viterbi decoders

COMBINATIONAL FUZZY-DECISION VITERBI DECODING SCHEME AND DEVICE FOR VEHICULAR COMMUNICATIONS SYSTEM VIA TIME-VARYING CHANNELS

FIELD OF THE INVENTION

The invention presents a combinational fuzzy-decision Viterbi decoding scheme and device for the high mobility Dedicated Short Range Communications (DSRC) system. The combinations of modified Π and S-membership functions based on the signal space diagram for the different BPSK, QPSK, 16-QAM and 64-QAM modulations are employed as a fuzzified decision rule for the fuzzy-decision constellation decoder. The invention is proposed to increase the coding gain of the Viterbi decoder for the DSRC system operated in the time-varying fading channel.

BACKGROUND OF THE INVENTION

Currently, the Viterbi algorithm is used to be implemented with either hard or soft decision decoder, which is stated hereinafter.

All the major wireless communication systems in use today use convolution channel codes. The Viterbi algorithm is the dominant method of decoding the convolution codes. The Viterbi algorithm is implemented using either hard or soft decision decoder. The soft-decision decoder is the recommended scheme to use with the Viterbi decoder because it provides a coding gain over hard decision Viterbi decoder. The Viterbi algorithm is a maximum likelihood rule which is optimum for an AWGN channel. For hard decision Viterbi decoder, the samples corresponding to a single bit of a codeword are quantized to two levels zero and one, a decision is made as whether each transmitted bit in a codeword is zero or one. The coding gain of the soft decision decoder with respect to hard decision increases to a little bit more than 2 dB for higher signal-to-noise ratio (SNR). The soft-decision Viterbi decoder is implemented using soft decision demodulation. The path metrics in the Viterbi algorithm are calculated by weighting the square Hamming distance between the soft decision and the reference value. A four-level discrete symmetric channel model is used for the soft decision decoder. The receiver assigns one of four values to each received signal. The underlined zero and one indicate the reception of a strong signal, while the non-underlined pair denotes the reception of a weaker signal. The four-level soft-decision Viterbi decoder is almost exactly as shown for the hard-decision case, the only difference being the increased number of path metrics.

SUMMARY OF THE INVENTION

In view of the disadvantages of prior art, the primary object of the present invention is to provides a combinational fuzzy-decision Viterbi decoding scheme and device for the high mobility Dedicated Short Range Communications (DSRC) system, that by employing the combinations of modified Π and S-membership functions based on the signal space diagram for the different BPSK, QPSK, 16-QAM and 64-QAM modulations as a fuzzified decision rule for the fuzzy-decision constellation decoder, not only the coding gain of the Viterbi decoder for the DSRC system operated in the time-varying fading channel can be increased, but also the construction of many other high mobility wireless communication systems, such as the digital broadcasting (DAB) system, the digital video broadcasting (DVB) system, etc., related with orthogonal frequency division multiplexing (OFDM) modulations in conjunction with the proposed scheme are possible.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is a block diagram of the baseband model for the DSRC system.

FIG. 2 shows puncturing patterns for ¾ coding rate.

FIG. 3($a$) illustrates the Π membership function, based on the description of the combinational fuzzy-decision Viterbi decoding device.

FIG. 3($b$) illustrates the S membership function, based on the description of the combinational fuzzy-decision Viterbi decoding device.

FIG. 4 illustrates the fuzzy-decision Viterbi decoder scheme, based on the description of the combinational fuzzy-decision Viterbi decoding device.

FIG. 5($a$) shows a constellation signal space diagram for BPSK.

FIG. 5($b$) shows a constellation signal space diagram for QPSK.

FIG. 5($c$) shows a constellation signal space diagram for 16-QAM.

FIG. 5($d$) shows a constellation signal space diagram for 64-QAM.

FIG. 6($a$) illustrates the modified Π' membership function, based on the description of the combinational fuzzy-decision Viterbi decoding device.

FIG. 6($b$) illustrates the modified S' membership function, based on the description of the combinational fuzzy-decision Viterbi decoding device.

FIG. 7($a$) illustrates the modified S" membership function, based on the description of the combinational fuzzy-decision Viterbi decoding device.

FIG. 7($b$) illustrates the modified $\Pi_1$" membership function, based on the description of the combinational fuzzy-decision Viterbi decoding device.

FIG. 7($c$) illustrates the modified $\Pi_2$" membership function, based on the description of the combinational fuzzy-decision Viterbi decoding device.

FIG. 8 shows BERs of the DSRC system using pilot sub-carrier-aided equalizer in different delay spread for 16 QAM-OFDM modulations.

FIG. 9 shows comparisons of BERs of the BPSK-OFDM DSRC system (3 Mbits/sec; 200 km/h) for different Viterbi decoders.

FIG. 10 shows comparisons of BERs of the QPSK-OFDM DSRC system (6 Mbits/sec; 200 km/h) for different Viterbi decoders.

FIG. 11 shows comparisons of BERs of the 16 QAM-OFDM DSRC system (12 Mbits/sec; 200 km/h) for different Viterbi decoders.

FIG. 12 shows comparisons of BERs of the 16 QAM-OFDM DSRC system (18 Mbits/sec; 200 km/h) for different Viterbi decoders.

FIG. 13 shows comparisons of BERs of the 64 QAM-OFDM DSRC system (24 Mbits/sec; 200 km/h) for different Viterbi decoders.

FIG. 14 shows comparisons of BERs of the 64 QAM-OFDM DSRC system (27 Mbits/sec; 120 km/h) for different Viterbi decoders.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

The OFDM system provides DSRC with data transmission rates of 9, 12, 18, 24 and 27 Mbps for 0-60 Km/hr vehicle speed and 3, 4.5, 6, 9 and 12 Mbps for 60-120 Km/hr vehicle speed. The system comprises 52 sub-carriers, modulated using BPSK, QPSK, 16-QAM or 64-QAM. Convolution coding is used with a coding rate of ½, ⅔, or ¾. The data rates are determined by the coding rate and modulation type. Ten short orthogonal frequency division multiplexing (OFDM) training symbols are used for packet detection, coarse frequency offset estimation and timing synchronization. Two periods of the long training symbols are used for the channel and fine frequency offset estimation. Each data OFDM symbol contains four pilot sub-carriers, which are used to track the carrier phase. The four received pilot signal phases are calculated using the estimated offset frequency and frequency channel response. The block diagram of the DSRC transmitter is shown in FIG. 1. After processing the scrambler, convolution encoder and interleaver, followed by mapping to BPSK, QPSK, 16-QAM or 64-QAM constellation points, the transmitting data stream is divided into several parallel bit streams. An OFDM signal is constructed using an inverse fast Fourier transform (IFFT).

The input vector to the IFFT is given as $$\vec{X}_m = [X_{m,0}, X_{m,1}, \ldots, X_{m,N-1}]^T \quad (1)$$

where $X_{m,k}$ represents the $k_{th}$ sub-carrier of the $m_{th}$ OFDM symbol and N is 64 in the DSRC system. The IFFT output signal vector is $$\vec{x}_m = [x_{m,0}, x_{m,1}, \ldots, x_{m,N-1}]^T \quad (2)$$

where $x_{m,n}$ is the $n_{th}$ sample point of the $m^{th}$ OFDM symbol.

$$x_{m,n} = \frac{1}{N}\sum_{k=0}^{N-1} X_{m,k}\exp(j2\pi nk) = IFFT\{X_{m,k}\} \quad (3)$$

The cyclic prefixes (CP), which are generated with the copies of the last parts of the OFDM symbol, are pre-pended to the front of each vector $\vec{x}_m$. The cyclic prefixing output signal vector is represented as $$\vec{x}_m^c = [x_{m,0}^c, x_{m,1}^c, \ldots, x_{m,N+q-1}^c]^T \quad (4)$$
$$= [x_{m,N-q}, x_{m,N-q+1}, \ldots, x_{m,N-1}, x_{m,0}, x_{m,1}, \ldots, x_{m,N-1}]^T$$

where $x_{m,n}^c$ is the $n_{th}$ sample point of the $m_{th}$ OFDM symbol and q is the length of the CP. Hence, the received signal vector is given by $$\vec{y}_m^c = \vec{x}_m^c \otimes \vec{h}_m + \vec{w}_m = [y_{m,0}^c, y_{m,1}^c, \ldots, y_{m,N+q-1}^c]^T \quad (5)$$

where $\otimes$ denotes linear convolution, $\vec{h}_m$ and $\vec{w}_m$ are the channel impulse response vector and the additive white Gaussian noise (AWGN) vector for the $m_{th}$ OFDM symbol, respectively. $y_{m,n}^c$ is the $n_{th}$ sample point of the $m_{th}$ OFDM symbol in the $m_{th}$ received signal vector $\vec{y}_m^c$. The channel impulse response vector $\vec{h}_m = [h_{m,0}, h_{m,1}, \ldots, h_{m,N-1}]^T$ can be represented by:

$$h_{m,n} = \sum_{i=0}^{\gamma-1} h_i^m e^{j\frac{2\pi}{N}f_{Di}Tn}\delta(\lambda - \tau_i), \quad 0 \leq n \leq N-1 \quad (6)$$

where $h_i^m$ is the complex impulse response of the $m_{th}$ OFDM symbol in the $i_{th}$ path; $f_{Di}$ is the $i_{th}$-path Doppler frequency shift, which may cause intercarrier interference (ICI) for the received signals; T is the sample period; $\lambda$ is the delay spread index; and $\tau_i$ is the $i_{th}$-path delay time normalized by sampling time.

After removing the CP, the received signal vector $\vec{y}_m$ is $$\vec{y}_m = [y_{m,0}, y_{m,1}, \ldots, y_{m,N-1}]^T = [y_{m,q}^c, y_{m,q+1}^c, \ldots, y_{m,N+q-1}^c]^T \quad (7)$$

where $y_{m,n}$ is the $n_{th}$ sample point of the $m_{th}$ OFDM symbol. The demodulated received signal vector is $$\vec{Y}_m = [Y_{m,0}, Y_{m,1}, \ldots, Y_{m,N-1}]^T \quad (8)$$

where $$Y_{m,k} = \sum_{n=0}^{N-1} y_{m,n}e^{-j\frac{2\pi}{N}nk} = FFT\{y_{m,n}\} \quad (9)$$

Suppose that the guard interval is longer than the length of the channel impulse response, that is, there is no inter-symbol interference between the OFDM symbols, the demodulated sample vector $\vec{Y}_m$ can then be represented as $$\vec{Y}_m = \vec{X}_m \vec{H}_m + \vec{I}_m + \vec{W}_m \quad (10)$$

$$\vec{H}_m = [H_{m,0}, H_{m,1}, \ldots, H_{m,N-1}]^T \quad (11)$$

$$\vec{I}_m = [I_{m,0}, I_{m,1}, \ldots, I_{m,N-1}]^T \quad (12)$$

$$H_{m,k} = \sum_{i=0}^{\gamma-1} h_i^m e^{j\pi f_{Di}T}\frac{\sin(\pi f_{Di}T)}{\pi f_{Di}T}e^{j\frac{2\pi\tau_i}{N}l}, \quad 0 \leq k \leq N-1 \quad (13)$$

$$I_{m,k} = \frac{1}{N}\sum_{i=0}^{\gamma-1}\sum_{\substack{K=0 \\ K \neq k}}^{N-1} h_i^m X_{m,k}\frac{1-e^{j2\pi(f_{Di}-k+K)}}{1-e^{j\frac{2\pi}{N}(f_{Di}-k+K)}}e^{-j\frac{2\pi\tau_i}{N}K}, \quad (14)$$
$$0 \leq k \leq N-1$$

where $\vec{W}_m = FFT\{\vec{w}_m\}$. $H_{m,k}$ is recognized as the accurate channel frequency response at the $k_{th}$ sub-carrier of the $m_{th}$ OFDM symbol, which is independent of transmitted signals $X_{m,k}$. $I_{m,k}$ is the ICI component in the received signal at the $k_{th}$ sub-carrier of the $m_{th}$ OFDM symbol, depending on the signal values $m_{th}$ modulated on all sub-carriers.

On the highway, the maximum vehicle speed is 200 km/hr. The DSRC system requires a more robust frequency and phase synchronization technology. Four uniform pilot sub-carriers, which are inserted in the positions of the 6th, 20th, 34th, and 48th sub-carriers for each of transmitted DSRC data symbols, are applied for the DSRC receiver to estimate the frequency and track the phase of the received signals. A pilot-based frequency synchronizer mechanism including LSE and interpolation is used for equalizing the pilot signal-aided frequency and phase synchronization.

The channel frequency responses for four pilot sub-carriers of the $m_{th}$ symbol are computed by $$\hat{H}_{m,p} = \begin{bmatrix} X_{m,6} & 0 & 0 & 0 \\ 0 & X_{m,20} & 0 & 0 \\ 0 & 0 & X_{m,34} & 0 \\ 0 & 0 & 0 & X_{m,48} \end{bmatrix}^{-1} \begin{bmatrix} Y_{m,6} \\ Y_{m,20} \\ Y_{m,34} \\ Y_{m,48} \end{bmatrix} \quad (15)$$

$$= \begin{bmatrix} Y_{m,6}/X_{m,6} \\ Y_{m,20}/X_{m,20} \\ Y_{m,34}/X_{m,34} \\ Y_{m,48}/X_{m,48} \end{bmatrix} = \begin{bmatrix} \hat{H}_{m,6} \\ \hat{H}_{m,20} \\ \hat{H}_{m,34} \\ \hat{H}_{m,48} \end{bmatrix}$$

After estimating the channel at pilot sub-carrier frequency with the LSE, all data sub-carriers of the $m_{th}$ symbol can be obtained through linear interpolation. Two consecutive pilot sub-carriers are used to determine the channel frequency response for the data sub-carriers that are located between $(p)_{th}$ and $(p+1)_{th}$ sub-carriers, where p is equal to 6, 20, 34 and 48.

$$\hat{H}_{m,n} = H_{m,p} + \frac{(H_{m,p+1} - H_{m,p})}{K} \times n \quad (16)$$

where n=1, 2, ..., K–1 and K is equal to 13 for the DSRC system. The constellation decoder input is obtained by the interpolated channel estimate $\hat{H}_{m,n}$.

$$\hat{Y}^m(x) = Y^m(x) \cdot \hat{H}_m(x) \quad (17)$$

where $\hat{H}_m(x) = \hat{H}_{m,n}$.

The protocol data unit (PDU) trains are applied to the physical layer for transmission. A length of 127 pseudo random sequence is used to scramble the data out of the binary sequence prior to the convolution encoding. The purpose of the scrambler is to prevent a long sequence of 1s or 0s in order to aid the timing recovery at the receiver. The generator polynomial of the pseudo random sequence is $$g(x) = x + x^4 + x^7 \quad (18)$$

where x is the unit-delay. The different initialization value is determined by the first 7 bits of each PDU train. The scrambled data sequence is encoded with a rate ½ convolution code with the generator polynomial $g^{(1)}(x)$ for the upper connection and $g^{(2)}(x)$ for the lower connection as follows:

$$g^{(1)}(x) = 1 + x^2 + x^3 + x^5 + x^6 \quad (19)$$

$$g^{(2)}(x) = 1 + x + x^2 + x^3 + x^6 \quad (20)$$

where x is the unit-delay for convolution codes and the lowest-order term in the polynomial corresponds to the input stage of the shift register. The connections are aligned to the end of the shift register, and a polynomial coefficient value of one indicates that the shift register output is connected to one of the output bits of the encoder using a modulo two addition.

The puncturing pattern is a block of bits that do not include the stolen bits within a certain period of bits. The stolen bits are defined by the bits that are not transmitted. FIG. 2 is the puncturing pattern, which is used to generate rate ¾ convolution code from the rate ½ convolution code. The puncturing pattern for rate ¾ convolution code has a period of 18 bits, and 6 bits are stolen. A convolution code may correct a large number of well-spaced errors, while at the same time being unable to handle an error burst introduced by the fading channel. The block interleaver/deinterleaver pair applied to the DSRC system can spread the burst error across onto nonadjacent sub-carriers and mapped alternately onto less and more significant bits of the constellation.

The Viterbi algorithm is a maximum likelihood rule which is optimum for an AWGN channel. For hard decision Viterbi decoder, the samples corresponding to a single bit of a codeword are quantized to two levels zero and one, a decision is made as whether each transmitted bit in a codeword is zero or one. The coding gain of the soft decision decoder with respect to hard decision increases to a little bit more than 2 dB for higher signal-to-noise ratio (SNR). The soft-decision Viterbi decoder is implemented using soft decision demodulation. The path metrics in the Viterbi algorithm are calculated by weighting the square Hamming distance between the soft decision and the reference value. A four-level discrete symmetric channel model is used for the soft decision decoder. The receiver assigns one of four values to each received signal. The underlined zero and one indicate the reception of a strong signal, while the non-underlined pair denotes the reception of a weaker signal. The four-level soft-decision Viterbi decoder is almost exactly as shown for the hard-decision case, the only difference being the increased number of path metrics.

The combinational fuzzy-decision Viterbi decoding scheme has a non-uniform infinite-quantization level. The receiver assigns a continuous complex value to each received signal z according to a combination of Π and S-membership functions, as shown in FIG. 3. The Π membership function, as shown in FIG. 3(a), is defined as follows.

$$\Pi(z; R, M) = \begin{cases} S(z; M-R, M-R/2, M) & \text{for } z \leq M \\ 1 - S(z; M, M+R/2, M+R) & \text{for } z \geq M \end{cases} \quad (21)$$

where the Π-membership function goes to zero at the points $$z = M \pm R \quad (22)$$

where the crossover points are at $$z = M \pm \frac{R}{2} \quad (23)$$

Notice that the R parameter is now equal to one, which is the total width at the crossover points; M parameter is now equal to zero, which is the middle point of the Π membership function. The S-function, as shown in FIG. 3(b), is defined as follows.

$$S(z; \alpha, \beta, \gamma) = \begin{cases} 0 & \text{for } z \leq \alpha \\ 2\left(\frac{z-\alpha}{\gamma-\alpha}\right)^2 & \text{for } \alpha \leq z \leq \beta \\ 1 - 2\left(\frac{z-\gamma}{\gamma-\alpha}\right)^2 & \text{for } \beta \leq z \leq \gamma \\ 1 & \text{for } z \geq \gamma \end{cases} \quad (24)$$

The fuzzy-decision Viterbi decoder, parallel-to-serial (P/S), fuzzy-decision constellation decoder and analog Viterbi decoder are shown in FIG. 4. The fuzzy decision constellation decoder estimate of the received $m_{th}$ symbol is $\hat{Y}^m(x) = \hat{I}^m(x) + j\hat{Q}^m(x)$ that are located in the signal space diagram shown in FIG. 5, where the values of $\hat{I}^m(x)$ and $\hat{Q}^m(x)$ are serially decoded according to the modulation type. For BPSK modulation, the value of $\hat{I}^m(x)$ is located between the interval of $(-1, 1)$ of BPSK signal space diagram is shown in FIG. 5(a). The original one bit binary data $(b_0)$ are decided using the S-membership functions as a decision rule, which is generated according to BPSK signal space diagram. FIG. 5(b) shows that both $\hat{I}^m(x)$ and $\hat{Q}^m(x)$ are located in the intervals of $(-1, 1)$ in the QPSK signal space diagram. The original two-bit vector $\vec{b}^{(2)}=(b_0, b_1)$ are also estimated using the S-membership functions as a decision rule. The S-membership function is used as a decision rule to determine $b_0$ from the received I-Channel signal component $\hat{I}^m(x)$ and to determine $b_1$ from Q-Channel signal component $\hat{Q}^m(x)$. The values of $\hat{I}^m(x)$ and $\hat{Q}^m(x)$ for 16-QAM modulation are located in the intervals of $(-3, -1, 1, 3)$, respectively. FIG. 5(c) shows that the original four-bit vector $\vec{b}^{(3)}=(b_0\ b_1\ b_2\ b_3)$ are estimated using the combination of modified $\Pi'$ and $S'$-membership functions as a decision rule, which is generated according to the signal space diagram of 16-QAM. The message points in each quadrant are assigned with Gray-encoded quad bits. Refer to the signal space diagram of 16-QAM, the combination of modified $\Pi'$ and $S'$-membership functions is generated and shown in FIG. 6. The modified $S'$-membership function is defined as $$S'(x) = \begin{cases} 0 & z(x) \leq -1 \\ S(z(x); -1, 0, 1) & -1 \leq z(x) \leq 1 \\ 1 & 1 \leq z(x) \end{cases} \quad (25)$$

where the function $S(x)$ is defined for $\alpha=-1$, $\beta=0$ and $\gamma=1$. The modified $\Pi'$-function is defined as $$\Pi'(x) = \begin{cases} 0 & z(x) \leq -3 \\ S(z(x); -3, -2, -1) & -3 \leq z(x) \leq -1 \\ 1 & -1 \leq z(x) \leq 1 \\ 1 - S(z(x); 1, 2, 3) & 1 \leq z(x) \leq 3 \\ 0 & z(x) \geq 3 \end{cases} \quad (26)$$

where $z(x)$ represents either $\hat{I}^m(x)$ or $\hat{Q}^m(x)$ and the S-function is defined in (24). The first two bits $(b_0\ b_1)$ and the last two bits $(b_2\ b_3)$ of each message point are estimated from the values of $\hat{I}^m(x)$ and $\hat{Q}^m(x)$, respectively. The modified $S'$-membership function is used as the decision rule to determine $b_0$ and $b_2$ and the modified $\Pi'$-membership function is used as the decision rule to determine $b_1$ and $b_3$. In FIG. 5(d), the values of $\hat{I}^m(x)$ and $\hat{Q}^m(x)$ for 64-QAM modulation are located in the intervals of $(-7, -5, -3, -1, 1, 3, 5, 7)$, respectively. The original six-bit vector $\vec{b}^{(4)}=(b_0\ b_1\ b_2\ b_3\ b_4\ b_5)$ are estimated using the combination of modified $\Pi_1''$, $\Pi_2''$ and $S''$-membership functions as the decision rules, which are generated from the 64-QAM signal space diagram and shown in FIG. 7. The modified $S''$-membership function is defined as $$S''(x) = \begin{cases} 0 & z(x) \leq -1 \\ S(z(x); -1, 1) & -1 \leq z(x) \leq 1 \\ 1 & 1 \leq z(x) \end{cases} \quad (27)$$

The modified $\Pi_1''$-membership function is defined as $$\Pi_1''(x) = \begin{cases} 0 & z(x) \leq -5 \\ S(z(x); -5, -4, -3) & -5 \leq z(x) \leq -3 \\ 1 & -3 \leq z(x) \leq 3 \\ 1 - S(z(x); 3, 4, 5) & 3 \leq z(x) \leq 5 \\ 0 & z(x) \geq 5 \end{cases} \quad (28)$$

The modified $\Pi_2''$-membership function is defined as $$\Pi_2''(x) = \begin{cases} 0 & z(x) \leq -7 \\ S(z(x); -7, -6, -5) & -7 \leq z(x) \leq -5 \\ 1 & -5 \leq z(x) \leq 3 \\ 1 - S(z(x); -3, -2, -1) & -3 \leq z(x) \leq -1 \\ 0 & -1 \leq z(x) \leq 1 \\ S(z(x); 1, 2, 3) & 1 \leq z(x) \leq 3 \\ 1 & 3 \leq z(x) \leq 5 \\ 1 - S(z(x); 5, 6, 7) & 5 \leq z(x) \leq 7 \\ 0 & 7 \leq z(x) \end{cases} \quad (29)$$

The first three bits $(b_0\ b_1\ b_2)$ and the last three bits $(b_3\ b_4\ b_5)$ of each message point are estimated from the values of $\hat{I}^m(x)$ and $\hat{Q}^m(x)$, respectively. The $S''$-membership function is used to determine $b_0$ and $b_3$ the modified $\Pi_1''$-membership function is used to determine $b_1$ and $b_4$ and the $\Pi_2''$-membership function is used to determine $b_2$ and $b_5$. The Viterbi decoder designed in FIG. 4 is a 64-state analog decoder with a traceback length of 24, 48, 96 and 144 for BPSK, QPSK, 16-QAM and 64-QAM, respectively. The fuzzy-decision constellation decoding bit vectors ($\vec{b}^{(i)}$) are input to analog Viterbi decoder to calculate the analog path metrics; the transmitted message bits are determined using the traceback through the trellis.

Packet detection, timing synchronization and coarse frequency offset estimation of the DSRC receiver are performed according to the algorithms provided in IEEE 802.11p standard. The simulations focus on comparing the DSRC system performance among the proposed fuzzy-decision Viterbi decoder, hard-decision and soft-decision Viterbi decoders. In the DSRC system, as shown in FIG. 1, the coherence time $T_c$ is calculated by $$T_c = \frac{0.423}{f_D} = \frac{0.423\lambda}{v_D} = \frac{0.423c}{v_D f_c} = 645.3\ \mu\text{sec} \quad (30)$$

where $f_D = f_{Di}$ for $i=1$ and 2. The maximum Doppler shift is given by $f_D = v_D/\lambda$, where $v_D$ is the maximum vehicle velocity, $f_c$ is the carrier frequency, and c is the velocity of light. The DSRC system is specified in the 5.85-5.925 GHz intelligent transportation system (ITS) radio services band. In a DSRC system, one frame contains 100 OFDM symbols. The total number of sub-carriers is 64 including four uniformly distributed pilot sub-carriers and 12 guard sub-carriers. According to the IEEE 802.11p standard, the minimum input signal to noise ratio values of the DSRC receiver for BPSK-OFDM (3 Mbps), QPSK-OFDM (6 Mbps), 16-QAM-OFDM (12 Mbps), 16-QAM-OFDM (18 Mbps), 64-QAM-OFDM (24 Mbps) and 64-QAM-OFDM (27 Mbps) modulations are 9, 12, 17, 24, 25 and 27 dB respectively, which are used as a basis for the evaluation of the receiver performance. The 3 Mbps, 6 Mbps, and 12 Mbps data transmission rates are generated by using rate ½ convolution code. The 18 Mbps and 27 Mbps data transmission rates are generated by using rate ¾ convolution code. The 24 Mbps data transmission rate is generated by rate ⅔ convolution code.

In this paper, we use Jakes' channel model to generate a time-varying Rayleigh fading channel simulator. The effects of AWGN and carrier frequency shift are also considered in the DSRC channel. Simulations are carried out for the vehicle speed $v_m$=200 km/hr, delay spread τ=200 nsec, 100 data symbols and different decision Viterbi decoder. When the delay spread exceeds 150 nsec, the severer frequency selective channel fading will be caused by reducing coherent bandwidth, is shown as FIG. 8. The BER performance of the DSRC receiver with BPSK OFDM (3 Mbps), QPSK OFDM (6 Mbps), 16-QAM OFDM (12 Mbps), 16-QAM OFDM (18 Mbps), 64-QAM OFDM (24 Mbps) and 64-QAM OFDM (27 Mbps) modulations are shown in FIGS. 9-14, respectively. FIGS. 9 and 10 show that the BERs for both BPSK and QPSK OFDM modulations using three different Viterbi decoders are reduced to less than $10^{-5}$ at the minimum signal-to-noise ratios (SNRs), which meet the requirements specified in the IEEE802.11p standard. FIG. 11 shows that the BER of 16-QAM OFDM DSRC system using a hard-decision decoder is higher than $10^{-5}$ at the minimum SNR (17 dB). For the case of 12 Mbps data transmission rate, the 16-QAM OFDM DSRC system using the soft-decision and fuzzy-decision decoders will be reduced to less than $10^{-5}$ at the minimum SNR (17 dB), which meet the requirements specified in the IEEE802.11p standard. It is noted that the fuzzy-decision decoder results in a performance improvement of 2 dB and 6 dB as compared to the soft-decision decoder and hard-decision decoder, respectively. FIG. 12 shows the BER of 16-QAM OFDM DSRC system using the hard-decision decoder can not lower than $10^{-4}$, when the data transmission rate increases to 18 Mbps. The 16-QAM OFDM DSRC system using the soft-decision and fuzzy-decision decoders will reduce the BER to less than $10^{-5}$ at the minimum SNR (24 dB), which meets the requirements specified in the IEEE802.11p standard. The fuzzy-decision decoder has a 1.5 dB coding gain as compared with the soft-decision decoder. FIG. 13 shows that the BER of 64-QAM OFDM DSRC system can not be lower than $10^{-4}$ for three different Viterbi decoders. In FIG. 14, when the vehicle speed reduces to $v_m$=120 km/hr, the 64-QAM OFDM DSRC system using three different Viterbi decoders can be reduced to less than $10^{-5}$ at the minimum SNR (27 dB), which meets the requirements specified in IEEE802.11p standard.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A combinational fuzzy-decision Viterbi decoder, comprising:
    a parallel to serial (P/S) converter, for converting parallelly transmitted signals into serially transmitted signals;
    a fuzzy decision constellation decoder, for estimating a received signal based on a combination of modified Π and S-membership functions; and
    a Viterbi decoder, using the estimation based on the combination of modified Π and S-membership functions as the input thereof to calculate analog path metrics while each path metric being calculated by weighting the square Hamming distance between zero and one and thus ranged between zero and one;
    wherein, a minimal path metric is acquired by using the traceback through the trellis and thus transmitted message bits are determined.

2. The combinational fuzzy-decision Viterbi decoder of claim 1, capable of being adapted for a high mobility dedicated short-range communications (DSRC) system operated in the time-varying fading channel.

3. The combinational fuzzy-decision Viterbi decoder of claim 1, wherein the estimation, using the modified Π and S-membership functions, is according the constellation space diagrams of BPSK, QPSK, 16-QAM and 64-QAM modulations.

4. The combinational fuzzy-decision Viterbi decoder of claim 1, wherein a fuzzy decision rule of the constellation decoder using the modified Π and S-membership functions, include S membership function, Π membership function, Π' membership function, S' membership function, $Π_1''$ membership function, $Π_2''$ and S''-membership functions.

5. The combinational fuzzy-decision Viterbi decoder of claim 1, capable of being be applied for many other high mobility wireless communication systems, high mobility digital audio broadcasting, (DAB) and digital vedio broadcasting (DVB), which are related with OFDM modulations.

* * * * *